United States Patent
Larumbe

(10) Patent No.: US 10,638,144 B2
(45) Date of Patent: Apr. 28, 2020

(54) CONTENT-BASED TRANSCODER

(71) Applicant: Facebook, Inc., Menlo Park, CA (US)

(72) Inventor: Federico Daniel Larumbe, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 40 days.

(21) Appl. No.: 15/460,189

(22) Filed: Mar. 15, 2017

(65) Prior Publication Data
US 2018/0270492 A1    Sep. 20, 2018

(51) Int. Cl.
*H04N 19/40* (2014.01)
*H04N 19/136* (2014.01)
*G06K 9/00* (2006.01)
*G06K 9/62* (2006.01)
*G06K 9/46* (2006.01)

(52) U.S. Cl.
CPC ......... *H04N 19/40* (2014.11); *G06K 9/00744* (2013.01); *G06K 9/6262* (2013.01); *G06K 9/6296* (2013.01); *H04N 19/136* (2014.11); *G06K 9/4642* (2013.01)

(58) Field of Classification Search
None
See application file for complete search history.

(56) References Cited

U.S. PATENT DOCUMENTS

| | | | | |
|---|---|---|---|---|
| 7,143,434 B1* | 11/2006 | Paek | .................. | G06K 9/00711 725/142 |
| 8,953,841 B1* | 2/2015 | Leblang | ............. | G06K 9/00671 345/633 |
| 2004/0125877 A1* | 7/2004 | Chang | ................ | G06K 9/00335 375/240.28 |
| 2005/0058197 A1* | 3/2005 | Lu | .......................... | H04N 19/40 375/240.03 |

(Continued)

OTHER PUBLICATIONS

Zhou Wang, A. C. Bovik, H. R. Sheikh and E. P. Simoncelli, "Image quality assessment: from error visibility to structural similarity," in IEEE Transactions on Image Processing, vol. 13, No. 4, pp. 600-612, Apr. 2004. doi: 10.1109/TIP.2003.819861 (Year: 2004).*

*Primary Examiner* — Tyler W. Sullivan
(74) *Attorney, Agent, or Firm* — FisherBroyles, LLP

(57) ABSTRACT

The disclosed method for performing content-based transcoding of images may include determining an image, calculating an extraction-feature set based on content of the image, calculating a distance measure based on the extraction-feature set according to an image recognition model, determining an image type for the image based on the distance measure, and storing the image according to the image type. When the image type of the image is a first image type, the disclosed computer-implemented method may generate a transcoded image from the image, store the transcoded image at a content-provider computing system, and refrain from storing the image at the content-provider computing system. Alternatively, when the image type of the (Continued)

image is a second image type, the disclosed computer-implemented method may refrain from generating the transcoded image from the image and store the image at the content-provider computing system. Various other methods, systems, and computer-readable media are also disclosed.

14 Claims, 4 Drawing Sheets

(56) References Cited

U.S. PATENT DOCUMENTS

| | | | |
|---|---|---|---|
| 2007/0076959 A1* | 4/2007 | Bressan | H04N 19/176 382/224 |
| 2010/0054329 A1* | 3/2010 | Bronstein | H04N 19/147 375/240.03 |
| 2011/0093492 A1* | 4/2011 | Sull | G06T 3/4092 707/769 |
| 2013/0166580 A1* | 6/2013 | Maharajh | H04L 65/605 707/758 |
| 2013/0195206 A1* | 8/2013 | McCarthy | H04N 19/46 375/240.27 |
| 2014/0002670 A1* | 1/2014 | Kolarov | H04N 17/004 348/180 |
| 2014/0059166 A1* | 2/2014 | Mann | H04L 65/60 709/217 |
| 2015/0063451 A1* | 3/2015 | Zhu | H04W 4/18 375/240.09 |
| 2015/0117791 A1* | 4/2015 | Mertens | H04N 19/176 382/239 |
| 2015/0179218 A1* | 6/2015 | Nadler | H04N 13/111 382/154 |
| 2015/0278629 A1* | 10/2015 | Vanderhoff | G06K 9/4652 382/162 |
| 2016/0021376 A1* | 1/2016 | Andreopoulos | H04N 17/004 348/181 |
| 2016/0086050 A1* | 3/2016 | Piekniewski | G06K 9/4671 382/103 |
| 2017/0344560 A1* | 11/2017 | Talur | H04L 67/06 |
| 2019/0075301 A1* | 3/2019 | Chou | H04N 19/159 |

* cited by examiner

CONTENT-BASED TRANSCODER

BACKGROUND

Features and capabilities associated with displaying images on a mobile device is evolving. For example, mobile device users download and an increasingly large number of mobile applications ("apps"), and many of these applications can capture or render images and upload them or download and display images.

Users can upload image files of various different content types, sizes, file or compression types, or a combination thereof to another device, such as a server or another user device. Further, service providers, such as for social networking services or image hosting services, can store the images uploaded by the users and post or redistribute the images to other devices.

To facilitate storage and exchange of data, various devices can transcode the uploaded image files. The image files can be transcoded, such as by changing size or compression of the image files, for storage and for reproduction of the image files. Transcoding the uploaded image files can reduce the file size for storage. Transcoding can further format the images into a format appropriate for the other devices in redistributing or outputting the images on the other devices.

However, transcoding the image files can also lead to irreversible changes or damages to certain images. As such, there is a need to for a content-based transcoder to promote optimum operation of the computing system.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Various embodiments are directed to recognizing and distinguishing image types for an image file. In some embodiments, the image types can be determined based on analyzing content values of the image file. When the image files are pictures, the image files can be transcoded using a transcoder mechanism before storage. When the image files are graphics, the image files can be stored without transcoding the content. The graphics can also be stored using a further transcoder mechanism before storage. The further transcoder can be different and/or can be for higher quality compression than the transcoder mechanism configured to transcode the picture.

In some embodiments, an image recognition model can be generated for analyzing the content values of the image files to recognize and distinguish the image types. The image recognition model can be generated using a machine-learning mechanism and a modeling set such as for supervised machine learning. The machine-learning mechanism, the image recognition model, or a combination thereof can be based on Bayesian networks.

In some embodiments, analysis of the content values can be implemented to generate an image histogram grouping the content values, such as luminosity values or color values, into bins. The groupings can be further analyzed for an extraction-feature set. The extraction-feature set can represent distinguishing features for the different image types.

For example, the extraction-feature set can include a size measure, a peak measure, a continuity measure, or a combination thereof. The size measure can represent a number or a quantity of groupings or the bins corresponding to, such as below or above, a size threshold. As a more specific example, the size measure can represent a number or a quantity of bins that have greater than a number of pixels represented by the size threshold.

The peak measure can represent can represent a dominance of a number of common content values. As a more specific example, the peak measure can represent a number or a quantity of histogram range within the largest few peaks.

The continuity measure can represent choppiness of the content values. As a more specific example, the continuity measure can represent a difference between values corresponding to successive bins.

In some embodiments, the image recognition model can be generated based on the extraction-feature set. In some embodiments, the image type of the image file can be determined based on the extraction-feature set. In some embodiments, the image type can be determined dynamically in real-time in response to receiving or accessing the image files.

Figure 1:
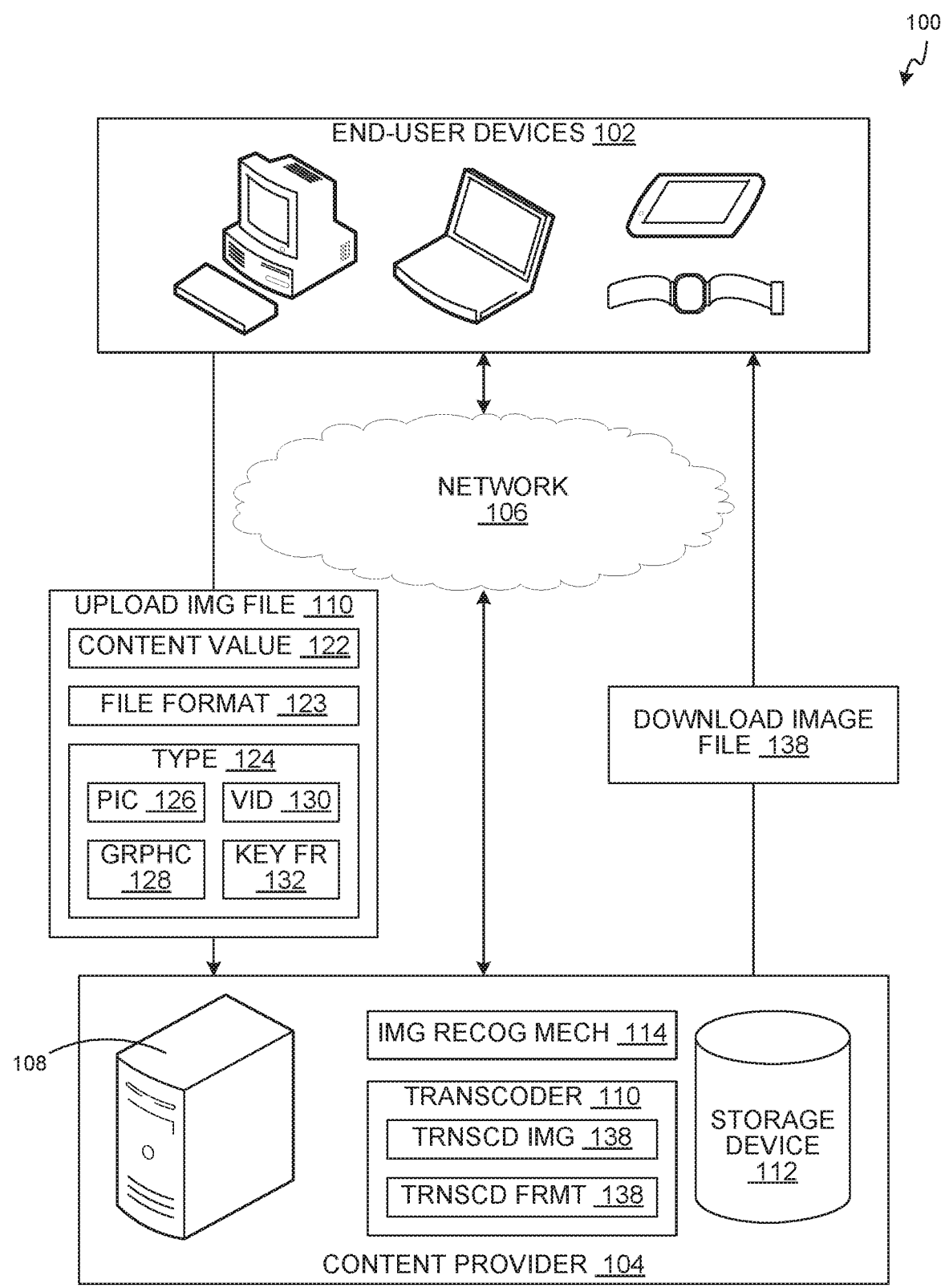
FIG. 1 is block diagram illustrating an overview of a computing system in which some embodiments may operate.

Referring now to the figures, FIG. 1 is block diagram illustrating an overview of a computing system 100 in which some embodiments may operate. As an example, the computing system 100 can include a social networking system, an image hosting system, a file storage or backup system, online retail system, or a cloud computing system. The computing system 100 can include one or more end-user devices 102 connected to a service provider 104 through an external network 106.

The end-user devices 102 can include one or more client computing devices (e.g., a wearable device, a mobile device, a desktop computer, a laptop, etc.,). The end-user devices 102 may operate in a networked environment using logical connections to one or more remote computers. The end-user devices 102 can connect to each other or other end-user devices 102, the service provider 104, or a combination thereof. The end-user devices 102 can connect using the external network 106.

The service provider 104 can include a circuit, a devices, a system, a function, or a combination thereof configured to process data for the end-user devices 102. For example, the service provider 104 can correspond to a social networking service, a telecommunication service, a wireless communication service, an internet service provider (ISP), an image hosting service, a file backup service, an online retail service, a cloud computing service, or a combination thereof. As a more specific example, the service provider 104 can include a data center, a mainframe computer, one or more servers 108, or a combination thereof.

For illustrative purposes, the service provider 104 is discussed below in relation to a social networking service and the computing system 100 as the social networking system. However, it is understood that the computing system 100 and the various embodiments discussed below can be applied to contexts or usage outside of social networking contexts, such as discussed above.

The external network 106 can include wired or wireless networks connecting various devices for communicating or exchanging data. For example, the external network 106 can include local area networks (LAN), wide area networks (WAN), wireless fidelity (WiFi) network, fiber optic networks, cellular network, the Internet, or a combination thereof. The external network 106 can further include other communication devices or components, such as routers, gateways, repeaters, base stations, switches, etc.

The computing system 100 can facilitate exchange of various different types of data between various devices. For example, the computing system 100 can process image files. The service provider 104 can include a transcoder mechanism 110, a storage device 112, an image recognition mechanism 114, or a combination thereof for processing the image files.

The transcoder mechanism 110 is a set of circuits, devices, functions, services, configurations, or a combination thereof for changing the image file. The transcoder mechanism 110 can compress, resize, reformat, or a combination thereof for the image file.

The storage device 112 can include a set of circuits or a network of storage components configured to retain information and provide access to the retained information. For example, the storage device 112 can include volatile or non-volatile memory. As a more specific example, the storage device 112 can include random access memory (RAM), magnetic disks or tapes, Flash memory. The storage device 112 can include persistent storage.

The image recognition mechanism 114 is a set of circuits, devices, functions, services, configurations, or a combination thereof for recognizing or distinguishing different contents of the image files. The image recognition mechanism 114 can determine an image type 124 for categorizing or describing contents of the image file.

The image recognition mechanism 114 can process the image files, such as an uploaded image file 120 or a downloaded image file 138, based on content values 122 therein. The uploaded image file 120 can be the image file sent from the end-user device 102 to the service provider 104, such as when a user uploads an image to a website. The downloaded image file 138 can be the image file sent from the service provider 104 to the end-user device 102, such as when the user accesses the website and views the images posted on the website.

The content values 122 can include data representing the image contained or represented in the file. For example, the content values 122 can include data corresponding to pixel values.

The content values 122 are different or separate from a file format 123. The file format 123 can include a representation of an arrangement for the content values 122, or a processing method or algorithm, such as a compression protocol for the content values. For example, the file format 123 can be represented as file extensions or types, such as '.jpg' or '.png'.

The image recognition mechanism 114 can distinguish or recognize the image type 124 for categorizing or describing the image content contained or represented in the file, separate from or in addition to the file format 123. The image recognition mechanism 114 can analyze the content values 122 to determine the image type 124, such as for a picture 126 or a graphic 128.

The picture 126 represents captured images. For example, the picture 126 can include photographed images or renderings of real-life scenes. The graphic 128 represents rendered or designed images. For example, the graphic 128 can include a drawing or a logo.

For illustrative purposes, the graphic 128 is discussed below in the context of a logo, such as for companies or services. However, it is understood that the graphic 128 can include different images, such as other man-made or designed images including graphs or drawings.

Also for illustrative purposes, the image recognition mechanism 114 is discussed below as recognizing or distinguishing between two types of images. However, it is understood that the image recognition mechanism 114 can process additional types of images or different levels of categorization, such as computer graphics, paintings, images of nature, images of people, structural designs or diagrams, etc.

The image recognition mechanism 114 can further process a video file 130 including a series of images sequenced over time. The video file 130 can include a series of frames, each including an image. The image recognition mechanism 114 can process the frames of the video file 130 and determine the image type 124 for each of the frames. The image recognition mechanism 114 can identify one or more key frames 132 based on the image type 124. For example, the image recognition mechanism 114 can identify the key frame 132 for the graphic 128, such as a logo, within the video file 130.

The computing system 100 can use the image recognition mechanism 114 to determine the image type 124, and subsequently process the image file according to the image type 124. For example, the computing system 100 can transcode the uploaded image file 120 using the transcoder mechanism 110 to generate a transcoded image 134 when the uploaded image file 120 contains the picture 126.

The transcoded image 134 is a reformatted instance of the image file, such as a compressed or resized instance of the content. The transcoded image 134 can correspond a transcoding format 136 different than the file format 123 of the original image file. The transcoding format 136 can include a representation of an arrangement for the content, or a processing method or algorithm, for the transcoded image 134.

The computing system 100 can reformat or convert the uploaded image file 120 for storage. The computing system 100 can generate the transcoded image 134 according to the transcoding format 136, based on reformatting or converting the uploaded image file 120.

For example, the computing system 100 can generate the transcoded image 134 by further or additionally compressing the uploaded image file 120 or reducing the size of the uploaded image file 120 for storage. Also for example, the computing system 100 can generate the transcoded image 134 by changing various possible instances of the file format 123 of the uploaded image file 120 into a transcoding format 136, such as for converting the files into a common file extension. The computing system 100 can store the transcoded image 134 in the storage device 112 instead of directly storing the uploaded image file 120.

The transcoder mechanism 110 can compress the image file in a variety of ways. As an illustrative example, the transcoder mechanism 110 can compress the image file as much as possible based on a target value, such as a structural similarity (SSIM) score or a multiscale SSIM (MS-SSIM), mean squared error, etc.

The transcoder mechanism 110 can compare the original image file and the transcoded image 134 to calculate the target value representing a similarity between the two images. The transcoder mechanism 110 can calculate the target score based on comparing luminance, contrast, structure, or a combination thereof for samples or pixel values. The comparison can be based on statistical derivations, such as for average, variance, covariance, or a combination thereof, of the samples or pixel values. For example, the transcoder mechanism 110 can generate the transcoded image 134 with score exceeding 0.9900, where 0.0 or −1.0 represents two images as being different and 1.0 represents two images as being identical to each other.

The computing system 100 can process the graphic 128 different from the picture 126. For example, the transcoder mechanism 110 can be designated for the picture 126 and not the graphic 128. When the image file, such as the uploaded image file, includes the graphic 128, the computing system 100 can bypass compression or transcoding process and store the image file without using the transcoder mechanism 110.

As a more specific example, the computing system 100 can directly store the image file identified as the graphic 128 without any transcoding. Also as a more specific example, the computing system 100 can store the graphic 128 based on transcoding with a different mechanism, such as for higher quality compression or for changing the file format 123 without any compression.

The transcoder mechanism 110 can transcode the picture 126, but often cause changes or damages to the graphic 128. The transcoder mechanism 110 can compress the graphic 128, such as for logos, highly to meet the target score, but the resulting transcoded image 134 can visually be very different than the original image file.

It has been discovered that determining the image type 124 and separately processing the graphic 128, such as logos, different than the picture 126, such as bypassing compression, provides increased accuracy in preserving images in the function of computer devices. By automatically recognizing or distinguishing the graphic 128, the computing system 100 can isolate a grouping of image files that categorically degrade when compressed or transcoded. The determination of the image type 124 can allow the graphic 128 to be processed differently than the picture 126, which can improve visual integrity of the graphic 128 for the computing system 100.

The computing system 100 can use machine learning to classify the picture 126 and the graphic 128. For example the computing system 100 can use supervised machine learning to generate models for recognizing or distinguishing the image types 124 from analyzing the content values 122.

The image recognition mechanism 114 can implement the resulting model to classify recognize image files as the graphic 128. The computing system 100 can use key features to determine the image type 124. Details regarding the image recognition mechanism 114 are discussed below.

The computing system 100 can further transcode the stored transcoded image 134 to generate the downloaded image file 138. The computing system 100 can transcode the stored image into the file format 123 appropriate for the requesting application or end-user device 102.

For example, the computing system 100 can use the transcoder mechanism 110, or a different or complementary instance thereof, to convert the stored image file into the file format 123 corresponding to the requesting browser or player. Also for example, the computing system 100 can transcode specifically for sending the downloaded image file 138 to a mobile or a set of devices, such as for wearable devices or smart phones, than a different group of devices, such as for laptops or other servers.

It should be noted that the term "server" as used throughout this application refers generally to a computer, an electronic device, a program, or any combination thereof that processes and responds to requests (e.g., from the end-user devices 102 or from other servers). Servers can provide data to the requesting "clients." The term "client" as used herein refers generally to a computer, a program, an electronic device, or any combination thereof that is capable of processing and making requests and/or obtaining and processing any responses from servers. Client computing devices and server computing devices may each act as a server or client to other server/client devices.

Figure 2A:
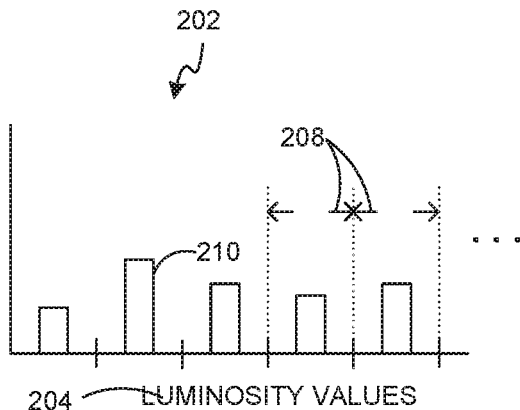
FIG. 2A and FIG. 2B are example illustrations of an image histogram, in accordance with various embodiments.
Figure 2B:
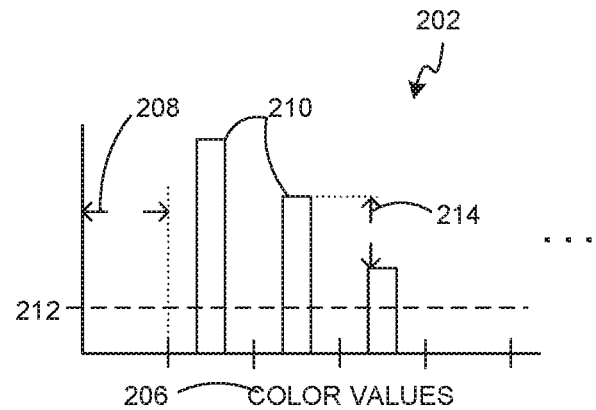

FIG. 2A and FIG. 2B are example illustrations of an image histogram 202, in accordance with various embodiments. The computing system 100 can generate the image histogram 202 to determine the image type 124 of FIG. 1. The computing system 100 can generate the image histogram 202 based on the content values 122 of FIG. 1 for the image file.

The image histogram 202 is a representation of a distribution of the content values 122 for the corresponding image file. The image histogram 202 can represent the distribution of various different content values 122. For example, the image histogram 202 can show the distribution or a number or percentage of instances corresponding to specific values for luminosity values 204, such as illustrated in FIG. 2A, or for color values 206, such as illustrated in FIG. 2B.

For illustrative purposes, the image histogram 202 is shown as a graph. However, it is understood that the image histogram 202 can be different. For example, the image histogram 202 can be a table or a listing.

The content values 122 can include the luminosity values 204 for overall brightness or intensity, the color values 206 corresponding to specific colors, or a combination thereof. The content values 122 can include the luminosity values 204, the color values 206, or a combination for each pixel or for groupings of pixels.

The computing system 100 can generate the image histogram 202 including bins 208. Each of the bins 208 can represent a specific instance or value for the luminosity values 204 or the color values 206. The bins 208 can be for grouping portions or values of the content, such as for grouping all instances of occurrences of the pixels or pixel locations with same display value. The computing system 100 can calculate a number or a percentage of pixels or locations corresponding to the value for each of the bins 208.

For FIG. 2A and FIG. 2B, the distribution or the number of occurrences for the particular value is illustrated along a vertical direction or axis. Also for FIG. 2A and FIG. 2B, the bins 208 or the particular value for the luminosity values 204 or the color values 206 are illustrated along a horizontal direction or axis.

The computing system 100 can further analyze the content values 122 of the image file to determine one or more peaks 210. The peaks 210 are the particular values or the corresponding bins 208 with largest occurrences or with occurrences exceeding a threshold or a comparison value.

The peaks 210 are illustrated in FIG. 2A and FIG. 2B as one or more of the highest bars or occurrences amongst the bins 208.

The computing system 100 can further analyze the content values 122 using a size threshold 212. The size threshold 212 can be a specific amount of occurrences, such as for a number or percentage of occurrences. The computing system 100 can analyze the content values 122 based on applying the size threshold 212 to the image histogram 202.

The computing system 100 can use the size threshold 212 to identify, classify, or group the bins 208 or the corresponding values according to the number or percentage of occurrences in the content values. For example, the computing system 100 can use the size threshold 212 to calculate a number or percentage of the bins 208 that have occurrence or percentage rates below, above, or equal to the size threshold 212.

The computing system 100 can further analyze the content values 122 based on calculating a continuity measure 214. The continuity measure 214 is a representation or a quantized measure of choppiness in the content values. The continuity measure 214 can be calculated using the image histogram 202. For example, the continuity measure 214 can be an absolute difference between occurrences for successive or abutting bins.

Figure 3:
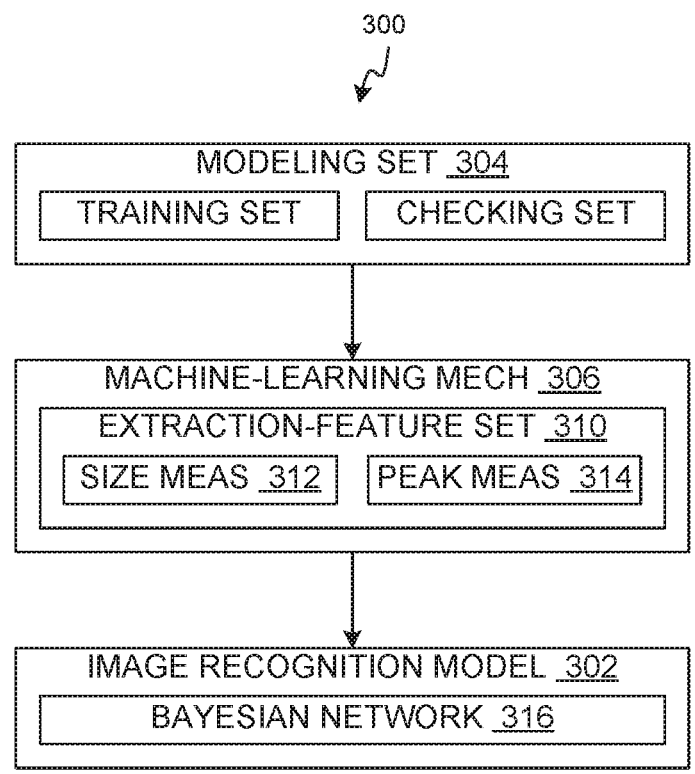
FIG. 3 is a block diagram illustrating an image recognition model, in accordance with various embodiments.

FIG. 3 is a block diagram illustrating an image recognition model 302, in accordance with various embodiments. The image recognition model 302 represents a function for categorizing the image files by determining the image type 124 of FIG. 1. The image recognition model 302 can be an output based on a modeling set 304, a machine-learning mechanism 306, or a combination thereof.

The machine-learning mechanism 306 is a method, a process, a function, a circuit, an instruction, a configuration or a combination thereof for performing functions with computing devices without explicitly programming the functions. The machine-learning mechanism 306 can be based on recognizing patterns for given data. The computing system 100 can use the machine-learning mechanism 306 to learn from a data set and make predictions or decisions according to the learned knowledge.

The modeling set 304 is a set of given data or examples for training the machine-learning mechanism 306. For example, the modeling set 304 can include a training set of data or examples, a test or checking set of data or examples, or a combination thereof. The modeling set 304 can be for supervised learning. The modeling set 304 can be labeled or conditioned for training the machine-learning mechanism 306.

For example, the computing system 100 can use the machine-learning mechanism 306, such as a supervised learning mechanism, to analyze the modeling set 304. The computing system 100 can generate the image recognition model 302 as the inferred function resulting based on implementing the supervised learning mechanism with the modeling set 304. The computing system 100 can configure or design the image recognition mechanism 114 of FIG. 1 to use or implement the image recognition model 302. The computing system 100 can use the image recognition model 302 to determine the image type 124 and recognize and distinguish between the picture 126 of FIG. 1 and the graphic 128 of FIG. 1

The computing system 100 can generate the image recognition model 302 based on an extraction-feature set 310. The extraction-feature set 310 is a grouping of one or more distinctive characteristics, features, or representations thereof for differentiating the image type 124.

The extraction-feature set 310 can include computer-readable data representing specific features or aspects of digital images that are unique for each image type 124. The extraction-feature set 310 can correspond to an input feature representation of the learned function. The computing system 100 can further use the extraction-feature set 310 to subsequently determine the image type 124 for other image files.

The extraction-feature set 310 can include one or more quantized representations for a variety of different visual characteristics or features of the image files. For example, the extraction-feature set 310 can include a size measure 312, a peak measure 314, the continuity measure 214 of FIG. 2, or a combination thereof. The extraction-feature set 310 can be based on the image histogram 202 of FIG. 2.

The size measure 312 can include a representation of a distribution width or range of the content values 122. The size measure 312 can be based on the size threshold 212 of FIG. 2. The size measure 312 can be for identifying groupings for the content or the bins 208 based on the size threshold 212.

For example, the size measure 312 can include a quantity, such as a number or a percentage, of the bins 208 of the image histogram 202 exceeding the size threshold 212. As a more specific example, the size measure 312 can be based on the size threshold 212 set at a low level, such as any real number below 5% of the pixels.

The peak measure 314 is can include a representation of a focus or concentration of the content values 122. The peak measure 314 can be based on the qualifying peaks 210 of FIG. 2. The peak measure 314 can be for peak measure for identifying a dominant pattern or concentration in the content values 122.

For example, the peak measure 314 can include a quantity, such as a number or a percentage, of histogram or occurrence range within the peaks 210. As a more specific example, the peak measure 314 can be based on the peaks 210 according to a predetermined condition or threshold, such as the top one, two, or more peaks, or peaks exceeding a certain occurrence measure.

The computing system 100 can use the machine-learning mechanism 306 to analyze the modeling set 304 including, corresponding to, tagged or labeled, or a combination thereof for the extraction-feature set 310. The computing system 100 can use the machine-learning mechanism 306 to further generate the image recognition model 302 according to the extraction-feature set 310. The computing system 100 can implement the learning algorithm using the machine-learning mechanism 306 to recognize the extraction-feature set 310 within the modeling set 304, or recognize patterns or groupings according to the extraction-feature set 310.

For example, the computing system 100 can use the machine-learning mechanism 306 to further generate the image recognition model 302 corresponding to a Bayesian network mechanism 316. The Bayesian network mechanism 316 can correspond to machine learning based on probabilistic relationships between factors. The Bayesian network mechanism 316 can correspond to scores for the probabilistic relationships, such as for the uploaded image file 120 of FIG. 1 corresponding to the picture 126 or the graphic 128.

Figure 4:
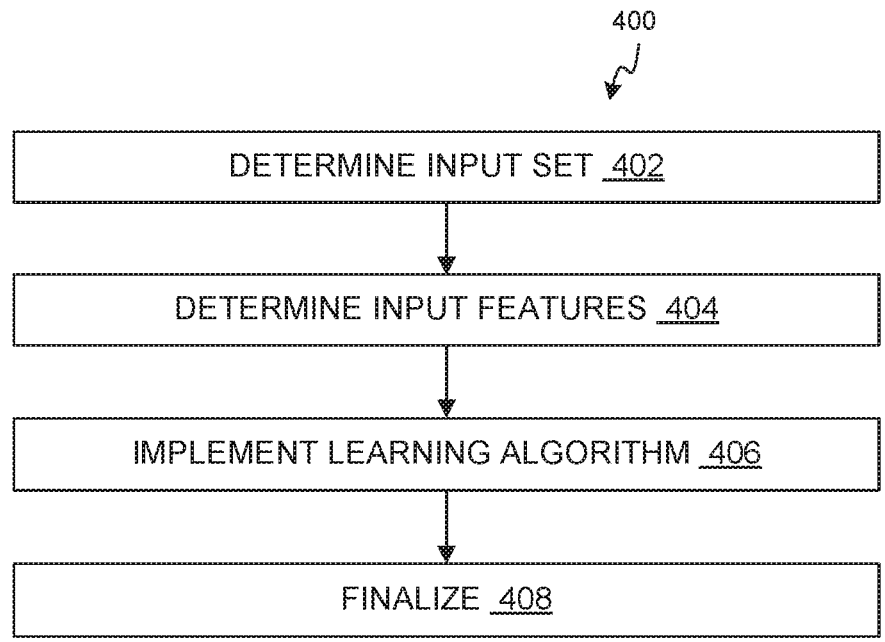
FIG. 4 is a flow chart illustrating an example method of operating the computing system of FIG. 1, in accordance with various embodiments.

FIG. 4 is a flow chart illustrating an example method 400 of operating the computing system 100 of FIG. 1, in accordance with various embodiments. The computing system 100 can implement the example method 400 to generate the image recognition model 302 of FIG. 3.

At block 402, the computing system 100 can determine an input set for generating the image recognition model 302. The computing system 100 can determine the modeling set 304 of FIG. 3 for implementing supervised machine learning.

The computing system 100 can determine the modeling set 304 based on accessing or receiving a set of designated image files corresponding to different image types 124, such as the picture 126 and the graphic 128. The modeling set 304 can include the image files designated as the training set, the checking set, or a combination thereof. The modeling set 304 can include the set of image files predetermined or designated by a designer, a programmer, a service, the computing system 100, or a combination thereof for the supervised machine learning.

At block 404, the computing system 100 can determine one or more input features for generating the image recognition model 302. The computing system 100 can determine the extraction-feature set 310 of FIG. 3 for the supervised machine learning.

The computing system 100 can determine the extraction-feature set 310 representing parameters unique to content of the image files according to the different image types. The computing system 100 can determine the extraction-feature set 310 for identifying the size measure 312 of FIG. 3, the peak measure 314 of FIG. 3, the continuity measure 214 of FIG. 2, or a combination thereof. The computing system 100 can determine the extraction-feature set 310 based on accessing or receiving the features predetermined or designated by a designer, a programmer, a service, the computing system 100, or a combination thereof for the supervised machine learning.

At block 406, the computing system 100 can implement the learning algorithm or the supervised machine learning. The computing system 100 can implement or execute the machine-learning mechanism 306 of FIG. 3. The computing system 100 can implement the machine-learning mechanism 306 to analyze the modeling set 304 according to the extraction-feature set 310.

For example, the computing system 100 can generate the image histograms 202 of FIG. 2 corresponding to the images for the modeling set 304. The computing system 100 can analyze the content values 122 of FIG. 1 of the images and generate the image histograms 202 accordingly.

As a more specific example, the computing system 100 can generate the image histograms 202 by grouping portions or levels of the content values 122. The computing system 100 can count or determine the occurrence of specific instances or levels of the luminosity values 204 of FIG. 2 or the color values 206 of FIG. 2. Each of the bins 208 of FIG. 2 can correspond to a different instance or a specific level of content values 122 of the corresponding image in or from the modeling set 304. The computing system 100 can generate the image histograms 202 based on associating the occurrence measure with the corresponding bin or level.

The computing system 100 can generate the image recognition model 302 based on the modeling set 304 according to the extraction-feature set. The computing system 100 can process the modeling set 304 according to the extraction-feature set 310 using the image histogram 202. The computing system 100 can generate the image recognition model 302 based on processing the image histograms 202 of the image files in the test set of the modeling set 304.

For example, the computing system 100 can calculate the size measure 312, the peak measure 314, the continuity measure 214, or a combination thereof for each of the images files using the image histograms 202. The computing system 100 can identify or group the image files of the test set according to the size measure 312, the peak measure 314, the continuity measure 214, or a combination thereof. The computing system 100 can generate the image recognition model 302 according to the groupings corresponding to the various image types 124, such as the picture 126 or the graphic 128.

As a more specific example, the computing system 100 can generate the image recognition model 302 associated with or including the Bayesian network mechanism 316 of FIG. 3. The computing system 100 can use the image recognition model 302 associated with the Bayesian network mechanism 316 for recognizing subsequent image files using a score or a likelihood that the files are of one or more of the image types 124.

At block 408, the computing system 100 can finalize the machine learning. Applicable control parameters or thresholds may be adjusted. Further, accuracy of the learned function or the image recognition model 302 can be calculated using the test set of the modeling set 304.

It has been discovered that the image recognition model 302 generated based on the extraction-feature set 310 including the size measure 312, the peak measure 314 and the continuity measure 214 improves functions of the computing system 100 by accurately recognizing and categorizing the image contained or represented by the image file. The size measure 312 and the peak measure 314 can quantify distinctions or traits associated with the graphic 128, such drawings or logos, having the content values 122 focused in a relatively small number of the peaks 210 in contrast to the picture 126 having diverse or distributed values. The continuity measure 214 can further quantify the choppy nature associated with the graphics 128 in contrast to smoother or gradual changes of the picture 126.

The extraction-feature set 310 including the size measure 312, the peak measure 314 and the continuity measure 214 allows for accurate distinction between the picture 126 and the graphic 128 or between other image types. The improved accuracy in recognizing and categorizing the content image can improve any subsequent functionalities or processes, such as for transcoding, storage, or display.

Figure 5:
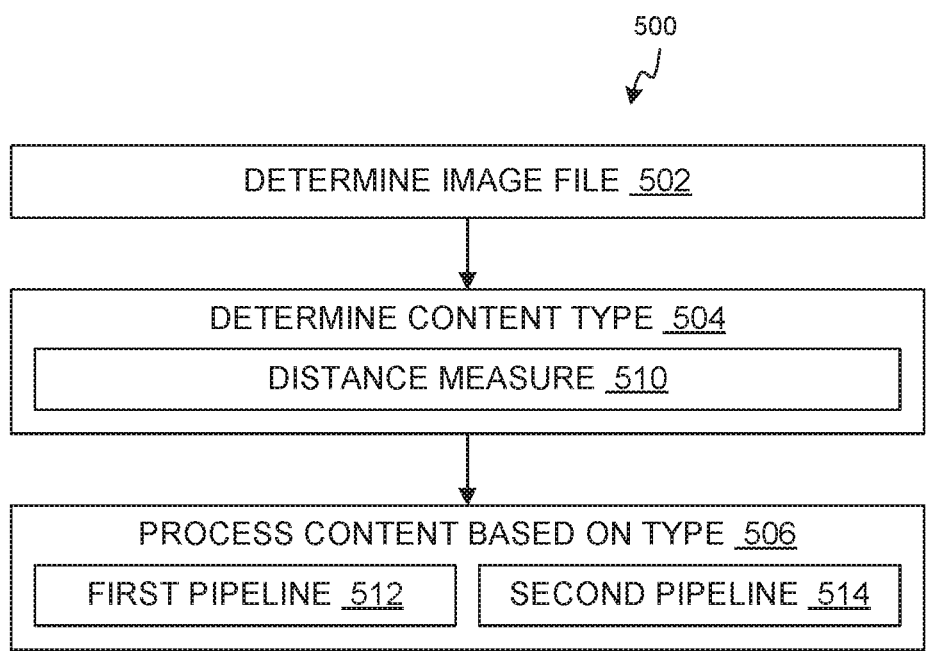
FIG. 5 is a flow chart illustrating a further example method of operating the computing system of FIG. 1, in accordance with various embodiments.

FIG. 5 is a flow chart illustrating a further example method 500 of operating the computing system 100 of FIG. 1, in accordance with various embodiments. The computing system 100 can use the machine learning illustrated in FIG. 4 to determine the image type 124 of FIG. 1 for image files, such as the uploaded image file 120 of FIG. 1. The computing system 100 can use the image recognition model 302 of FIG. 3 generated based on implementing the machine-learning mechanism 306 of FIG. 3 with the modeling set 304 of FIG. 3 based on the extraction-feature set 310 of FIG. 3.

At block 502, the computing system 100 can determine the image file. The computing system 100 can determine the image file based on accessing or receiving the image file. For example, the computing system 100 can access stored instance of the image file, such as from a memory. Also for example, the computing system 100 can receive the image file, such as the uploaded image file 120, from another device using a device interface or communication circuitry.

At block 504, the computing system 100 can determine the content type. The computing system 100 can determine the content type by determining the image type 124. The computing system 100 can determine the image type 124 based on analyzing the content of the image file.

The computing system 100 can analyze the image contained or represented in the file based on analyzing the content values 122 of FIG. 1, such as the luminosity values 204 or the color values 206. The computing system 100 can analyze the content of the uploaded image file 120 according to the luminosity value 204 or the color values 206 therein. The computing system 100 can analyze the image contained or represented in the file separate from or in addition to processing the file format 123 of FIG. 1.

The computing system 100 can analyze the content in a variety of ways. For example, the computing system 100 can analyze the content values 122 based on generating the image histogram 202 of FIG. 2. The computing system 100 can generate the image histogram 202 based on determining specific levels or instances for the luminosity value 204 or the color values 206. The computing system 100 can determine a number or a percentage of occurrences for the specific levels or instances and organize or associated the number or the percentage using the bins 208 of FIG. 2 corresponding to the specific levels or instances.

Also for example, the computing system 100 can calculate the extraction-feature set 310 for the image files. The computing system 100 can calculate the extraction-feature set 310, such as the size measure 312, the peak measure 314, the continuity measure 214, or a combination thereof, based on the content values 122 of the image file, such as the luminosity values 204 or the color values 206.

As a more specific example, the computing system 100 can calculate the extraction-feature set 310 based on analyzing the image histogram 202. The computing system 100 can calculate the size measure 312 for identifying groupings for the content based on the size threshold, such as by calculating a number or a percentage of the bins 208 with values exceeding the size threshold 212. The computing system 100 can calculate the peak measure 314 for identifying a dominant pattern in the content values 122, such as by calculating a number or a percentage of the range within the histogram within the largest peaks 210 of FIG. 2. The computing system 100 can calculate the continuity measure 214 for characterizing choppiness of the content, such as by calculating an absolute difference between values for successive or abutting instances of the bins 208.

Also for example, the computing system 100 can calculate a distance measure 510 based on analyzing the content. The computing system 100 can calculate the distance measure 510 representing a similarity to known or established image types 124 or a likelihood that the analyzed content is of one or more image types 124. The computing system 100 can calculate the distance measure 510 for representing a likelihood or a degree of certainty that the analyzed image is the picture 126, the graphic 128, or a combination thereof.

The computing system 100 can calculate the distance measure 510 according to the image recognition model 302. The computing system 100 can further calculate the distance measure 510 based on results of the extraction-feature set 310 for the content values 122. The computing system 100 can calculate the distance measure 510 corresponding to the Bayesian network mechanism 316.

As a more specific example, the computing system 100 can calculate the distance measure 510 can compare the size measure 312, the peak measure 314, the continuity measure 214, or a combination thereof to the corresponding values of images in the modeling set 304 as represented by the image recognition model 302. The computing system 100 can calculate the distance measure 510 representing a similarity between the analyzed image and one or more groupings of images in the modeling set 304.

The computing system 100 can determine the image type 124 for the image contained or represented in the image file based on result of the analysis, such as the image histogram 202, the results of the extraction-feature set 310, the distance measure 510, or a combination thereof. The computing system 100 can determine the image type 124 and classify the image file, such as the uploaded image file 120, as the picture 126 or the graphic 128.

The computing system 100 can determine the image type 124 for the accessed image file, such as the uploaded image file 120, in real-time. The computing system 100 can implement blocks 502, 504, and subsequently, block 506, all in real-time. The computing system 100 can receive or access the image file and determine the content type in response to receiving or accessing the image file.

The computing system 100 can also implement the method 400 of FIG. 4 in real-time. The computing system 100 can implement the method 400 along with or integrated with the method 500.

For example, the computing system 100 can implement or execute the supervised learning and use the resulting image recognition model 302 to classify subsequent image files. Also for example, the computing system 100 can implement or execute the machine learning to or along with the received or accessed image file in real-time. Also for example, results or validations for classifying the image files can be feedback to update the machine learning or the resulting model.

The computing system 100 can further determine the image type 124 for the video file 130 of FIG. 1. For example, the computing system 100 can determine the image type 124 for each frame or individual images for each moment or time within the video file 130. The computing system 100 can receive or access the video file 130, such as discussed above for the block 502. The computing system 100 can determine the image type of each frame of the video file 130 based on analyzing the content values 122 of each frame or image as discussed above.

The computing system 100 can further identify one or more key frames 132 of FIG. 1 within the video file 130 based on the image type 124. For example, the computing system 100 can use a marker, a link, a status or a state, a listing or a combination thereof to identify the frame or the image in the video file 130 corresponding to a specific instance of the image type 124.

As a more specific example, the computing system 100 can identify the key frame 132 as the image or the frame with the image type 124 of the picture 126 or the graphic 128. Also as a more specific example, the computing system 100 can identify the key frame 132 that have the image type 124 different than the remaining frames or images within the video file 130.

At block 506, the computing system 100 can process the image file based on or according to the image type 124. The computing system 100 can take different actions or processes according to the classification of the image contained in the file or the resulting determination of the image type 124. The computing system 100 can store the image file differently according to the image type 124.

For example, the computing system 100 can process the image files corresponding to the picture 126 using a first processing pipeline 512 and the files corresponding to the graphic 128 using a second processing pipeline 514. For the first processing pipeline 512, the computing system 100 can transcode the image file with the transcoder mechanism 110 of FIG. 1 before storage when the image file corresponds to classification of the picture 126.

For the first processing pipeline 512, the computing system 100 can generate the transcoded image 134 of FIG. 1 based on transcoding the image file with the image type 124 of the picture 126. The computing system 100 can use the transcoder mechanism 110 designated or configured for the picture 126 for the first processing pipeline 512. The computing system 100 can store the transcoded image 134 in the storage device 112 of FIG. 1 for the first processing pipeline 512.

For the second processing pipeline 514, the computing system 100 can bypass the transcoder mechanism 110 designated or configured for the picture 126 when the image file corresponds to classification of the graphic 128. The computing system 100 can directly store the image file, such as the uploaded image file 120, corresponding to the image type 124 of the graphic 128 without transcoding or compressing the image file for the second processing pipeline 514. The computing system 100 can also store based on transcoding or compressing the graphic 128 using a mechanism or a format different than the transcoder mechanism 110, such as for high-quality compression or for changing the file format 123 without compression.

It has been discovered that determining the image type 124 based on analyzing the content values 122 in real-time improves image integrity and system robustness in preserving images in the function of computer devices. The computing system 100 can automatically recognize or distinguish the graphic 128 from the picture 126, or according to other specific image types 124. The image files can be processed or transcoded according to the image type 124 to prevent any irreversible loss or degradation to the content image for certain instances of the image type 124.

It has further been discovered that processing the image files differently according to the image type 124 including bypassing the transcoder mechanism 110 provides image integrity and system robustness in preserving images in the function of computer devices. Certain types of images, such as the graphic 128 corresponding to logos or man/computer-made images, have been known to cause problems when transcoded or compressed using conventional methods. Determination of the image type 124 as discussed above can accurately categorize the images, which enables the computing system 100 to bypass the problem-causing processes and preserve the original image.

It has further been discovered that determining the image type 124 according to the extraction-feature set 310 including the size measure 312, the peak measure 314 and the continuity measure 214 improves accuracy and lowers processing time in recognizing the graphic 128 for improving functionalities of the computing system 100. The image recognition mechanism 114 and the image recognition model 302 can recognize the distinguishing features using the size measure 312, the peak measure 314 and the continuity measure 214. The size measure 312, the peak measure 314 and the continuity measure 214 can enable computing devices or systems to quantize, measure, process, and recognize the distinguishing features according to the image type 124 to improve the accuracy. Further, the size measure 312, the peak measure 314 and the continuity measure 214 can be calculated using simple calculations, which reduces the necessary processing time and resources for the calculations. The reduction in processing time and resources can allow for the devices or systems to determine the image type 124 in real-time.

It has further been discovered that determining the image type 124 based on analyzing the luminosity values 204 improves processing speed and reduces necessary resources for improving functionalities of the computing system 100. The computing system 100 can process the luminosity values 204 having lesser possible levels or dimensions than the color values 206 to determine the image type 124 without loss of accuracy. The reduced possible levels or dimensions allow for faster processing with less resources, such as memory, allotted time, etc.

It has further been discovered that identifying the key frame 132 within the video file 130 based on analyzing the content values 122 enable computing devices or systems to accurately preserve images in the video file 130. The computing system 100 can use the key frame 132 to identify portions in the video file 130 at risk of loss based on transcoding or compression. The computing system 100 can process the video file 130 according the key frame 132 and the image type 124 to prevent any loss or degradation for the corresponding image or portion.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

For illustrative purposes, the computing system 100 has been described above in the context of the social networking system. However, it is understood that the computing system 100 can be applicable to different contexts, such as for image hosting, advertising, online market or shopping, etc. For example, the uploading user can be an advertiser, a service provider or a seller of an item. Also for example, the uploading user can be a subscriber, a website or service member or user, a consumer, etc.

Figure 6:
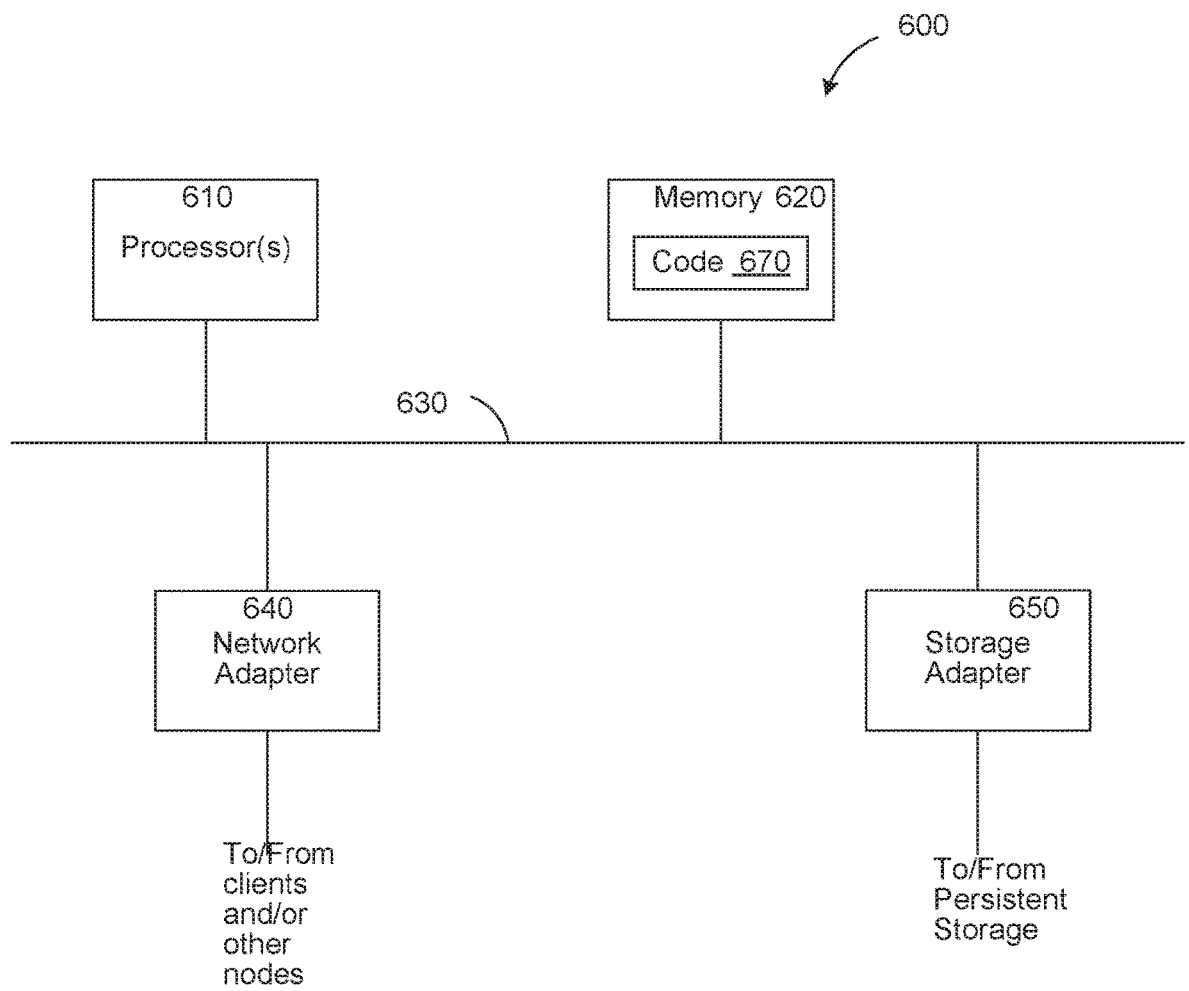
FIG. 6 is a block diagram of an example of a communicating device, which may represent one or more communicating device or server described herein, in accordance with various embodiments.

FIG. 6 is a block diagram of an example of a computing device 600, which may represent one or more computing devices or servers described herein, in accordance with various embodiments. The computing device 600 can include one or more devices that implement the computing system 100 of FIG. 1. The computing device 600 can execute at least part of the method 400 of FIG. 4, the method 500 of FIG. 5, or both. The computing device 600 includes one or more processors 610 and memory 620 coupled to an interconnect 630. The interconnect 630 is an abstraction that represents any one or more separate physical buses, point-to-point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire". The interconnect 630 can also include wireless connection or communications between components.

The processor(s) 610 is/are the central processing unit (CPU) of the computing device 600 and thus controls the overall operation of the computing device 600. In certain embodiments, the processor(s) 610 accomplishes this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the computing device 600. The memory 620 represents any form of random access memory (RAM), read-only memory (ROM), flash memory, or the like, or a combination of such devices. In use, the memory 620 may contain a code 670 containing instructions according to the image recognition-transcoding system disclosed herein.

Also connected to the processor(s) 610 through the interconnect 630 are a network adapter 640 and a storage adapter 650. The network adapter 640 provides the computing device 600 with the ability to communicate with remote devices, over a network and may be, for example, an Ethernet adapter, Fibre Channel adapter, or a wireless modem. The network adapter 640 may also provide the computing device 600 with the ability to communicate with other computers. The storage adapter 650 enables the computing device 600 to access a persistent storage, and may be, for example, a Fibre Channel adapter or SCSI adapter.

The code 670 stored in memory 620 may be implemented as software and/or firmware to program the processor(s) 610 to carry out actions described above. In certain embodiments, such software or firmware may be initially provided to the computing device 600 by downloading it from a remote system through the computing device 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; and/or optical storage media; flash memory devices), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. Reference in this specification to where a result of an action is "based on" another element or feature means that the result produced by the action can change depending at least on the nature of the other element or feature.

What is claimed is:

1. A computer-implemented method, comprising:
identifying, at a content-provider computing system, a transcoding pipeline that is known to degrade, more than a predetermined amount, a perceived quality of image files of a first image type but not image files of a second image type, wherein the transcoding pipeline:
   takes inputted image files;
   generates transcoded image files from the inputted image files;
   stores the transcoded image files at the content-provider computing system; and
   refrains from storing the inputted image files at the content-provider computing system;
training an image recognition model to distinguish the image files of the first image type from the image files of the second image type;
receiving, at the content-provider computing system from a client computing system, an image file;
calculating an extraction-feature set based on content of the image file;
before storing the image file at the content-provider computing system, determining if the transcoding pipeline would degrade the perceived quality of the image file more than the predetermined amount by:
   calculating a similarity score based on the extraction-feature set according to the image recognition model; and
   determining an image type of the image file based on the similarity score, wherein the image type of the image file is one of the first image type or the second image type; and
storing the image file according to the image type by:
   when the image type of the image file is the second image type, transcoding the image file with the transcoder pipeline, wherein transcoding the image file with the transcoder pipeline comprises:
      generating a transcoded image file from the image file;
      storing the transcoded image file at the content-provider computing system; and
      refraining from storing the image file at the content-provider computing system; and
   when the image type of the image file is the first image type:
      refraining from generating the transcoded image file from the image file by bypassing the transcoding pipeline; and
      storing the image file at the content-provider computing system.

2. The computer-implemented method of claim 1, wherein:
the second file type comprises graphics; and
determining the image type of the image file includes classifying the image file as a graphic in real-time.

3. The computer-implemented method of claim 1, wherein:
the first file type comprises graphics; and
determining the image type of the image file includes classifying the image file as a graphic in real-time.

4. The computer-implemented method of claim 1, wherein:
 calculating the extraction-feature set includes calculating a size measure, wherein the size measure is for identifying groupings for the content based on a size threshold; and
 the similarity score is calculated based on the size measure.

5. The computer-implemented method of claim 1, wherein:
 calculating the extraction-feature set includes calculating a peak measure, wherein the peak measure is for identifying a dominant pattern in the content; and
 the similarity score is calculated based on the peak measure.

6. The computer-implemented method of claim 1, wherein:
 calculating the extraction-feature set includes calculating a continuity measure, wherein the continuity measure is for characterizing absolute differences between values of abutting bins in an image histogram generated based on the content of the image file; and
 the similarity score is calculated based on the continuity measure.

7. The computer-implemented method of claim 1, further comprising:
 analyzing the content of the image file according to luminosity values; and
 wherein:
  the extraction-feature set is calculated based on the luminosity values.

8. The computer-implemented method of claim 1, further comprising:
 analyzing the content of the image file according to color values; and
 wherein:
  the extraction-feature set is calculated based on the color values.

9. The computer-implemented method of claim 1, further comprising:
 generating an image histogram based on the content of the image file, wherein the image histogram includes bins for grouping portions or values of the content; and
 wherein:
  the extraction-feature set is calculated based on analyzing the image histogram.

10. The computer-implemented method of claim 1, wherein:
 receiving the image file includes receiving a video file;
 determining the image type of the image file includes classifying each frame of the video file; and
 further comprising:
  identifying a key frame within the video file based on the image type.

11. A non-transitory computer readable data storage memory storing computer-executable instructions that, when executed by a content-provider computing system, cause the content-provider computing system to perform a computer-implemented method, the instructions comprising:
 instructions for identifying a transcoding pipeline of the content-provider computing system that is known to degrade, more than a predetermined amount, a perceived quality of image files of a first image type but not image files of a second image type, wherein the transcoding pipeline:
  takes inputted image files;
  generates transcoded image files from the inputted image files;
  stores the transcoded image files at the content-provider computing system; and
  refrains from storing the inputted image files at the content-provider computing system;
 instruction for training an image recognition model trained to distinguish the image files of the first image type from the image files of the second image type;
 instructions for receiving, at the content-provider computing system from a client computing system, an image file;
 instructions for calculating an extraction-feature set based on content of the image file;
 instructions for determining, before storing the image file at the content-provider computing system, if the transcoding pipeline would degrade the perceived quality of the image file more than the predetermined amount by:
  calculating a similarity score based on the extraction-feature set according to the image recognition model; and
  determining an image type of the image file based on the similarity score, wherein the image type of the image file is one of the first image type or the second image type; and
 instructions for storing the image file according to the image type by:
  when the image type of the image file is the second image type, transcoding the image file with the transcoder pipeline, wherein transcoding the image file with the transcoder pipeline comprises:
   generating a transcoded image file from the image file;
   storing the transcoded image file at the content-provider computing system; and
   refraining from storing the image file at the content-provider computing system; and
  when the image type of the image file is the first image type:
   refraining from generating the transcoded image file from the image file by bypassing the transcoding pipeline; and
   storing the image file at the content-provider computing system.

12. The non-transitory computer readable data storage memory of claim 11, wherein the instructions further comprise:
 instructions for generating an image histogram based on the content of the image file, wherein the image histogram includes bins for grouping portions or values of the content; and
 wherein:
  the instructions for calculating the extraction-feature set includes instructions for calculating a size measure based on the image histogram, wherein the size measure is for identifying the bins based on a size threshold.

13. The non-transitory computer readable data storage memory of claim 11, wherein the instructions further comprise:
 instructions for generating an image histogram based on the content of the image file, wherein the image histogram includes bins for grouping portions or values of the content; and wherein:
the instructions for calculating the extraction-feature set includes instructions for calculating a peak measure based on the image histogram, wherein the peak measure is for identifying a dominant pattern in the content.

14. The non-transitory computer readable data storage memory of claim 11, wherein the instructions further comprise:
instructions for generating an image histogram based on the content of the image file, wherein the image histogram includes bins for grouping portions or values of the content; and wherein:
the instructions for calculating the extraction-feature set includes instructions for calculating a continuity measure based on the image histogram, wherein the continuity measure is for characterizing absolute differences between values of abutting bins in an image histogram generated based on the content of the image file.

* * * * *

UNITED STATES PATENT AND TRADEMARK OFFICE
CERTIFICATE OF CORRECTION

PATENT NO.        : 10,638,144 B2
APPLICATION NO.   : 15/460189
DATED             : April 28, 2020
INVENTOR(S)       : Federico Daniel Larumbe It is certified that error appears in the above-identified patent and that said Letters Patent is hereby corrected as shown below:

In the Claims

In Column 18, Line 9 approx., Claim 11, before "to" delete "trained".

Signed and Sealed this
Twenty-third Day of June, 2020

Andrei Iancu
*Director of the United States Patent and Trademark Office*